United States Patent
Kikuchi et al.

(10) Patent No.: US 10,950,269 B2
(45) Date of Patent: Mar. 16, 2021

(54) OPTICAL RECORDING MEDIUM AND METHOD FOR MANUFACTURING THE SAME

(71) Applicant: SONY CORPORATION, Tokyo (JP)

(72) Inventors: Minoru Kikuchi, Miyagi (JP); Akio Koshita, Miyagi (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/631,531

(22) PCT Filed: Jun. 11, 2018

(86) PCT No.: PCT/JP2018/022163
§ 371 (c)(1),
(2) Date: Jan. 16, 2020

(87) PCT Pub. No.: WO2019/021652
PCT Pub. Date: Jan. 31, 2019

(65) Prior Publication Data
US 2020/0176027 A1    Jun. 4, 2020

(30) Foreign Application Priority Data

Jul. 25, 2017  (JP) .............................. JP2017-143673

(51) Int. Cl.
*G11B 7/24*          (2013.01)
*G11B 7/24024*    (2013.01)
(Continued)

(52) U.S. Cl.
CPC ...... *G11B 7/24024* (2013.01); *G11B 7/24041* (2013.01); *G11B 7/24047* (2013.01)

(58) Field of Classification Search
None
See application file for complete search history.

(56) References Cited

U.S. PATENT DOCUMENTS

| 5,681,634 A * | 10/1997 | Miyamoto | ............ B29C 45/263 |
| | | | 428/64.6 |
| 6,445,676 B1 * | 9/2002 | Fujii | .................. G11B 7/24024 |
| | | | 369/281 |

(Continued)

FOREIGN PATENT DOCUMENTS

| CN | 1050280 A | 3/1991 |
| CN | 1215367 A | 4/1999 |

(Continued)

OTHER PUBLICATIONS

Yagi Masatake "Information Recording Medium, Apparatus of Manufacturing Information Recording Medium and Method of Manufacturing Information Recording Medium," JP 2015103268 A, Machine-Translation, published Jun. 4, 2015. (Year: 2015).*

(Continued)

*Primary Examiner* — William J Klimowicz
(74) *Attorney, Agent, or Firm* — Chip Law Group

(57) ABSTRACT

An optical recording medium includes a first disk, a second disk, and an adhesive layer for bonding the first disk to the second disk. The first disk and the second disk each include a substrate having a first surface and a second surface and having a gradient on an outer peripheral portion of the second surface, two or more information signal layers disposed on the first surface, an intermediate layer disposed between adjacent information signal layers, and a cover layer covering the two or more information signal layers and the intermediate layer. The second surface of the substrate included in the first disk faces the second surface of the substrate included in the second disk with the adhesive interposed therebetween.

5 Claims, 10 Drawing Sheets

(51) Int. Cl.
*G11B 7/24041* (2013.01)
*G11B 7/24047* (2013.01)

(56) References Cited

U.S. PATENT DOCUMENTS

| | | | | |
|---|---|---|---|---|
| 6,603,733 | B2* | 8/2003 | Tsukagoshi | G11B 7/24038 |
| | | | | 369/280 |
| 7,194,751 | B2* | 3/2007 | Fujii | G11B 7/24024 |
| | | | | 369/281 |
| 9,552,839 | B2* | 1/2017 | Yoshida | G11B 7/24047 |
| 2002/0018438 | A1 | 2/2002 | Tsukagoshi et al. | |
| 2015/0279411 | A1 | 10/2015 | Yoshida et al. | |

FOREIGN PATENT DOCUMENTS

| | | | | | |
|---|---|---|---|---|---|
| CN | 201629145 | U | * | 11/2010 | |
| CN | 102782757 | A | | 11/2012 | |
| EP | 1178478 | A2 | | 2/2002 | |
| EP | 3660846 | A1 | | 6/2020 | |
| JP | 60079541 | A | * | 5/1985 | G11B 7/24 |
| JP | 60103535 | A | * | 6/1985 | G11B 7/24 |
| JP | 60185233 | A | * | 9/1985 | G11B 7/24 |
| JP | 61142543 | A | * | 6/1986 | |
| JP | 62009550 | A | * | 1/1987 | |
| JP | 02-285535 | A | | 11/1990 | |
| JP | 02282941 | A | * | 11/1990 | |
| JP | 02304736 | A | * | 12/1990 | |
| JP | 03272035 | A | * | 12/1991 | |
| JP | 06-004911 | A | | 1/1994 | |
| JP | 10149581 | A | * | 6/1998 | |
| JP | 2000-040257 | A | | 2/2000 | |
| JP | 2002-050080 | A | | 2/2002 | |
| JP | 2002-074756 | A | | 3/2002 | |
| JP | 2002367231 | A | * | 12/2002 | |
| JP | 2006-031753 | A | | 2/2006 | |
| JP | 2007-234192 | A | | 9/2007 | |
| JP | 2015-103268 | A | | 6/2015 | |
| JP | 2015-197936 | A | | 11/2015 | |
| KR | 10-2010-0043761 | A | | 4/2010 | |
| WO | 2019/021652 | A1 | | 1/2019 | |

OTHER PUBLICATIONS

International Search Report and Written Opinion of PCT Application No. PCT/JP2018/022163, dated Sep. 11, 2018, 09 pages of ISRWO.

Office Action for CN Patent Application No. 201880047688.5, dated Nov. 3, 2020, 08 pages of Office Action and 09 pages of English Translation.

* cited by examiner

OPTICAL RECORDING MEDIUM AND METHOD FOR MANUFACTURING THE SAME

CROSS REFERENCE TO RELATED APPLICATIONS

This application is a U.S. National Phase of International Patent Application No. PCT/JP2018/022163 filed on Jun. 11, 2018, which claims priority benefit of Japanese Patent Application No. JP 2017-143673 filed in the Japan Patent Office on Jul. 25, 2017. Each of the above-referenced applications is hereby incorporated herein by reference in its entirety.

TECHNICAL FIELD

The present disclosure relates to an optical recording medium and a method for manufacturing the same.

BACKGROUND ART

As an optical recording medium, a bonding type optical recording medium such as a digital versatile disc (DVD) is widely known. This optical recording medium includes a first substrate having an information signal layer on one surface thereof and a second substrate (dummy substrate) having no information signal layer, and has a configuration in which the second substrate is bonded to one surface of the first substrate having the information signal layer.

In recent years, a bonding type optical recording medium having a configuration different from the configuration described above has been proposed. This optical recording medium includes two disks each including a substrate, two or more information signal layers disposed on the substrate, an intermediate layer disposed between adjacent information signal layers, and a cover layer covering the two or more information signal layers and the intermediate layer. Among both surfaces of these disks, the surfaces on the substrate sides are bonded to each other with an adhesive (see, for example, Patent Document 1). In this optical recording medium, the adhesive sandwiched between inner peripheral portions of the first and second disks is stretched from the inner peripheral portions to outer peripheral portions by a spin coating method, and then the adhesive is cured by ultraviolet irradiation. As a result, the two disks are bonded to each other.

CITATION LIST

Patent Document

Patent Document 1: Japanese Patent Application Laid-Open No. 2015-197936

SUMMARY OF THE INVENTION

Problems to be Solved by the Invention

However, in the optical recording medium described above, when the adhesive is stretched from the inner peripheral portions to the outer peripheral portions by a spin coating method in a bonding step, bulges are formed on the outer peripheral portions on both surfaces of the optical recording medium. When the bulges are formed on the outer peripheral portions in this way, the quality of the optical recording medium may be deteriorated. For example, depending on the degree of the bulge, a return signal obtained by reflection of laser reproduction light by the optical recording medium may be deteriorated, and a servo may be released.

An object of the present disclosure is to provide an optical recording medium capable of suppressing a bulge of an outer peripheral portion and a method for manufacturing the same.

Solutions to Problems

In order to solve the above-described problem, the first disclosure relates to an optical recording medium including a first disk, a second disk, and an adhesive layer for bonding the first disk to the second disk, in which the first disk and the second disk each include a substrate having a first surface and a second surface and having a gradient on an outer peripheral portion of the second surface, two or more information signal layers disposed on the first surface, an intermediate layer disposed between adjacent information signal layers, and a cover layer covering the two or more information signal layers and the intermediate layer, and the second surface of the substrate included in the first disk faces the second surface of the substrate included in the second disk with the adhesive interposed therebetween.

The second disclosure relates to a method for manufacturing an optical recording medium, the method including sandwiching an adhesive between a first disk and a second disk, and rotating the first disk and the second disk to stretch the adhesive, in which the first disk and the second disk each include a substrate having a first surface and a second surface and having a gradient on an outer peripheral portion of the second surface, two or more information signal layers disposed on the first surface, an intermediate layer disposed between adjacent information signal layers, and a cover layer covering the two or more information signal layers and the intermediate layer, and the second surface of the substrate included in the first disk faces the second surface of the substrate included in the second disk with the adhesive interposed therebetween.

Effects of the Invention

According to the present disclosure, it is possible to suppress a bulge of an outer peripheral portion of an optical recording medium. Note that the effects described here are not necessarily limited, and may be any of the effects described in the present disclosure or may be different therefrom.

MODE FOR CARRYING OUT THE INVENTION

In the present disclosure, an optical recording medium may be any one of a read-only type, a write-once type, and a rewritable type.

In the present disclosure, an information signal layer includes at least a recording layer or a reproduction layer. In a case where the information signal layer is a recording layer, the optical recording medium preferably further includes a dielectric layer on at least one surface of the recording layer, and more preferably includes dielectric layers on both surfaces of the recording layer from a viewpoint of improving storage reliability. It is preferable to use the recording layer alone without disposing the dielectric layer on either surface of the recording layer from a viewpoint of simplifying a layer configuration and manufacturing equipment.

In the present disclosure, in a case where the optical recording medium includes a plurality of information signal layers each including a recording layer and a dielectric layer disposed on at least one surface side of the recording layer, all the plurality of information signal layers preferably have the same layer configuration from a viewpoint of productivity. In a case where the plurality of information signal layers has the same layer configuration including a first dielectric layer, a recording layer, and a second dielectric layer, each of the first dielectric layer, the recording layer, and the second dielectric layer preferably includes the same type of material in the respective information signal layers from a viewpoint of productivity.

Embodiments of the present disclosure will be described in the following order.
Outline
Configuration of optical recording medium
Configuration of die
Operation of die
Method for manufacturing optical recording medium
Effect

[Outline]

Figure 1A:
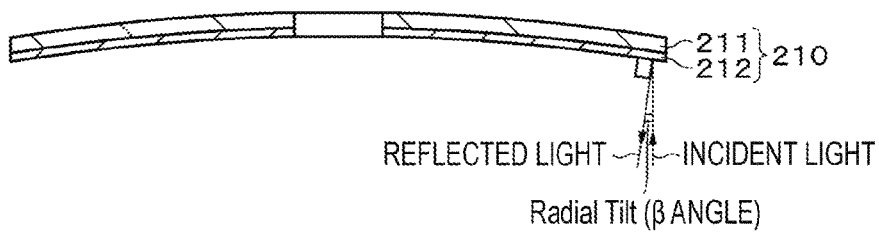
FIG. 1A is a cross-sectional view illustrating a state of a disk.

The present inventors made intensive studies in order to suppress a bulge of an outer peripheral portion of an optical recording medium. According to finding of the present inventors, as illustrated in FIG. 1A, in a state before bonding, a disk 210 has a large warp deforming a surface on a side where a cover layer 212 is disposed into a concave shape. This is because when the disk 210 cures an ultraviolet curable resin constituting the cover layer 212 and an intermediate layer (not illustrated), the ultraviolet curable resin contracts, and a stress that pulls a substrate 211 acts. Here, the intermediate layer is disposed between information signal layers (not illustrated) and separates the information signal layers from one another.

Figure 1B:
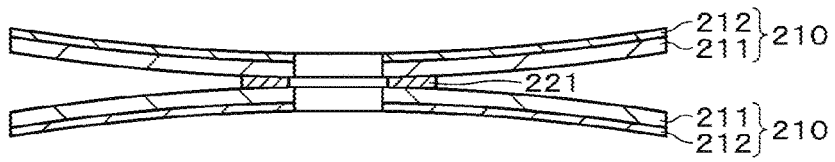
FIG. 1B is a cross-sectional view illustrating states of two disks stacked with an adhesive interposed therebetween.
Figure 1C:
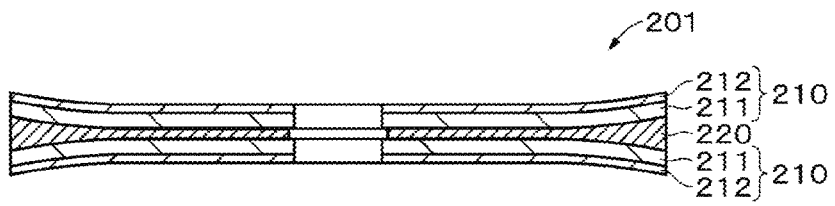
FIG. 1C is a cross-sectional view illustrating states of two disks bonded with an adhesive.

Therefore, as illustrated in FIG. 1B, in a case where the two disks 210 are stacked such that the substrates 211 of the disks 210 face each other and an adhesive 221 is interposed between inner peripheral portions of the disks 210, outer peripheral portions of the two disks 210 are open. In such a state, when the adhesive 221 is stretched from the inner peripheral portions of the disks 210 to the outer peripheral portions thereof by a spin coating method, and the stretched adhesive 221 is cured, as illustrated in FIG. 1C, an adhesive layer 220 in the outer peripheral portions becomes thicker, and bulges are formed on the outer peripheral portions of both surfaces of an optical recording medium 201. Formation of such a bulge is considered to be caused by surface tension acting on the adhesive 221 on an outer peripheral side during spin coating, and a warp generated in the disk 210 in a single plate state.

Therefore, the present inventors made intensive studies of an optical recording medium capable of suppressing a bulge formed on an outer peripheral portion even in a case where warps are generated in the two disks 210. As a result, it has been found that by forming a gradient on the outer peripheral portion of a surface on the adhesive layer side out of both surfaces of the substrate, and forming a space for storing the adhesive stretched by spin coating on the outer peripheral portions of the two stacked disks, a bulge formed on the outer peripheral portions of both surfaces of the optical recording medium can be suppressed. Hereinafter, an optical recording medium having such a configuration will be described.

[Configuration of Optical Recording Medium]

Figure 2A:
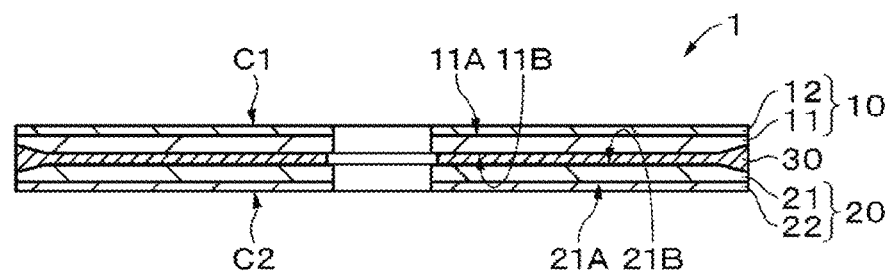
FIG. 2A is a cross-sectional view illustrating an example of a configuration of an optical recording medium according to an embodiment of the present disclosure.

As illustrated in FIG. 2A, an optical recording medium 1 according to an embodiment of the present disclosure is a bonding type and write-once type optical recording medium, and includes a first disk 10, a second disk 20, and an adhesive layer 30 disposed between the first disk 10 and the second disk 20. The optical recording medium 1 is an optical recording medium that records data on both a groove track and a land track (hereinafter referred to as "land/groove recording system"), and has a disk shape having an opening (hereinafter referred to as "center hole") in the center. Note that the shape of the optical recording medium 1 is not limited to a disk shape, and may be another shape.

Figure 3:
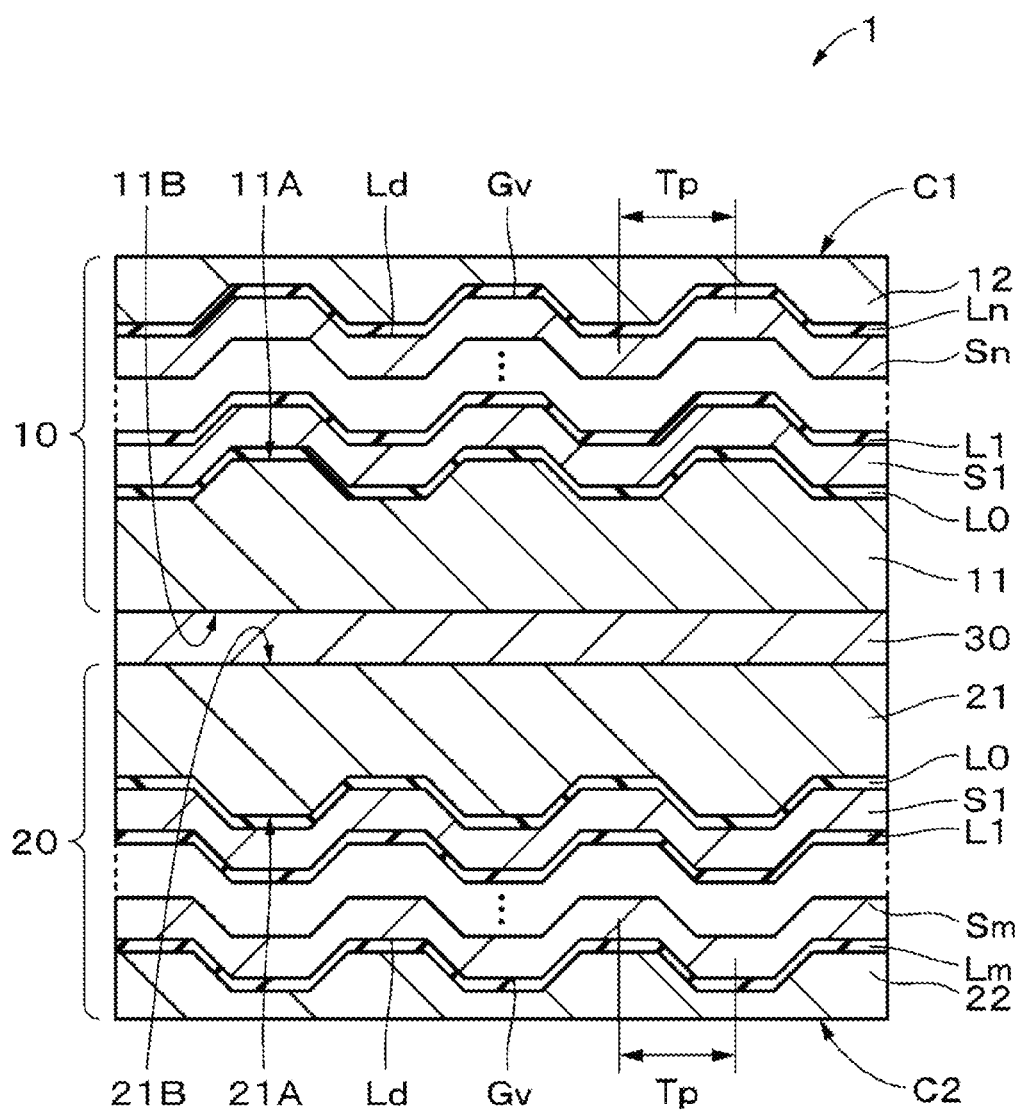
FIG. 3 is a cross-sectional view illustrating an example of a configuration of each of the first and second disks.

As illustrated in FIG. 3, the first disk 10 includes a substrate 11 having a first surface 11A and a second surface 11B, information signal layers L0 to Ln and intermediate layers S1 to Sn disposed on the first surface 11A, and a cover layer 12 covering the information signal layers L0 to Ln and the intermediate layers S1 to Sn. The intermediate layers S1 to Sn are disposed between adjacent information signal layers L0 and L1, between adjacent information signal layers L1 and L2, ..., and between adjacent information signal layers Ln-1 and Ln, respectively. The second disk 20 includes a substrate 21 having a first surface 21A and a second surface 21B, information signal layers L0 to Lm and intermediate layers S1 to Sm disposed on the first surface 21A, and a cover layer 22 covering the information signal layers L0 to Lm and the intermediate layers S1 to Sm. The intermediate layers S1 to Sm are disposed between adjacent information signal layers L0 and L1, between adjacent information signal layers L1 and L2, ..., and between adjacent information signal layers Ln-1 and Lm, respectively. Provided that n and m are each independently an integer of 2 or more, and preferably an integer of 3 or more, for example, 3 or 4. Note that in the following description, the information signal layers L0 to Ln and L0 to Lm are referred to as information signal layers L in a case where the information signal layers L0 to Ln and L0 to Lm are not particularly distinguished from each other.

The optical recording medium 1 has light irradiation surfaces irradiated with light for recording or reproducing an information signal on both surfaces thereof. More specifically, the optical recording medium 1 has a first light irradiation surface C1 irradiated with laser light for recording or reproducing an information signal of the first disk 10 and a second light irradiation surface C2 irradiated with laser light for recording or reproducing an information signal of the second disk 20.

In the first disk 10, the information signal layer L0 is located at the innermost position with respect to the first light irradiation surface C1, and the information signal layers L1 to Ln are located in front of the information signal layer L0. For this reason, the information signal layers L1 to Ln can transmit laser light used for recording or reproduction. Meanwhile, in the second disk 20, the information signal layer L0 is located at the innermost position with respect to the second light irradiation surface C2, and the information signal layers L1 to Lm are located in front of the information signal layer L0. For this reason, the information signal layers L1 to Lm can transmit laser light used for recording or reproduction. Note that although not illustrated, the optical recording medium 1 may further include hard coat layers on front surfaces of the cover layers 12 and 22 (first light irradiation surface C1 and second light irradiation surface C2).

The optical recording medium 1 records or reproduces an information signal of the first disk 10 as follows. That is, by irradiating the information signal layers L0 to Ln included in the first disk 10 with laser light from the first light irradiation surface C1 on the cover layer 12 side, the information signal of the first disk 10 is recorded or reproduced. For example, by collecting laser light having a wavelength in a range of 350 nm or more and 410 nm or less with an objective lens having a numerical aperture in a range of 0.84 or more and 0.86 or less, and irradiating the information signal layers L0 to Ln included in the first disk 10 with the light from the cover layer 12 side, the information signal is recorded or reproduced.

Meanwhile, an information signal of the second disk 20 is recorded or reproduced as follows. That is, by irradiating the information signal layers L0 to Lm included in the second disk 20 with laser light from the second light irradiation surface C2 on the cover layer 22 side, the information signal of the second disk 20 is recorded or reproduced. For example, by collecting laser light having a wavelength in a range of 350 nm or more and 410 nm or less with an objective lens having a numerical aperture in a range of 0.84 or more and 0.86 or less, and irradiating the information signal layers L0 to Lm included in the second disk 20 with the light from the cover layer 22 side, the information signal is recorded or reproduced. Examples of such an optical recording medium 1 include an archival disc (AD).

A spiral direction of the first disk 10 may be opposite to that of the second disk 20. In this case, recording and reproduction from the first light irradiation surface C1 and the second light irradiation surface C2 can be performed simultaneously. Therefore, a data transfer speed during recording or reproduction can be increased to a value of approximately twice.

Hereinafter, the substrates 11 and 21, the adhesive layer 30, the information signal layers L0 to Ln and L0 to Lm, the intermediate layers S1 to Sn and S1 to Sm, and the cover layers 12 and 22 constituting the optical recording medium 1 will be sequentially described.

(Substrate)

Figure 2B:
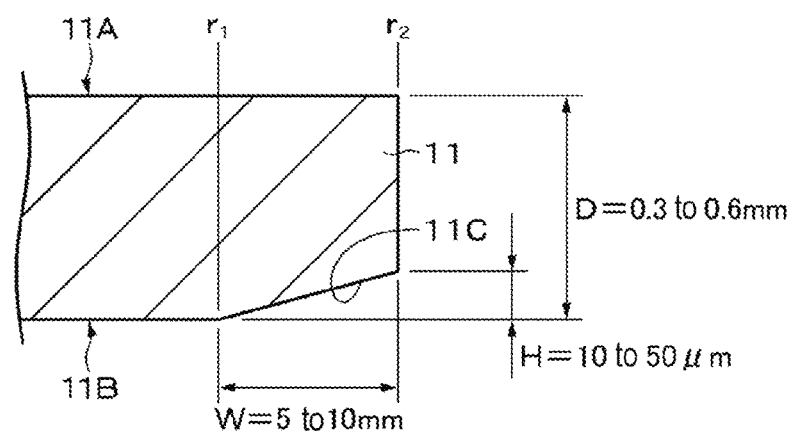
FIG. 2B is a cross-sectional view illustrating an example of the shape of an outer peripheral portion of a substrate included in a first disk.
Figure 2C:
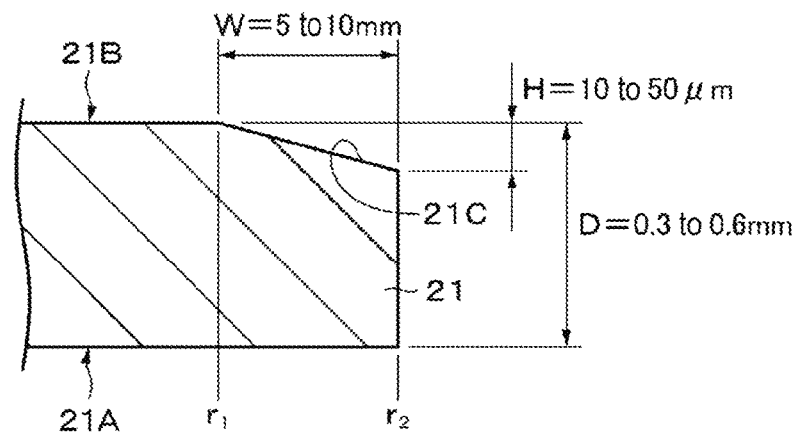
FIG. 2C is a cross-sectional view illustrating an example of the shape of an outer peripheral portion of a substrate included in a second disk.

The substrates 11 and 21 each have, for example, a disk shape with a center hole in the center. As illustrated in FIG. 2B, a gradient 11C is formed on an outer peripheral portion of the second surface 11B of the substrate 11. Similarly, as illustrated in FIG. 2C, a gradient 21C is formed on an outer peripheral portion of the second surface 21B of the substrate 21. The facing gradients 11C and 21C form a space for storing an adhesive stretched by spin coating.

The gradients 11C and 21C are inclined such that the thicknesses of the substrates 11 and 21 become thinner in a radial direction, respectively. Here, the radial direction means a direction from the center of each of the substrates 11 and 21 toward an outer periphery. The height H of each of the gradients 11C and 21C is preferably 50 μm or less, more preferably 10 μm or more and 50 μm or less, still more preferably 10 μm or more and 30 μm or less, and particularly preferably 10 μm or more and 20 μm or less. When the height H of each of the gradients 11C and 21C is 50 μm or less, it is possible to suppress the amount of fluctuation in bulge in the radial direction at the outer peripheral portions of the first light irradiation surface C1 and the second light irradiation surface C2.

The width W of each of the gradients 11C and 21C in the radial direction is preferably 5 mm or more and 10 mm or less, and more preferably 6 mm or more and 8 mm or less. When the width W of each of the gradients 11C and 21C is less than 5 mm, the space for storing the adhesive stretched by spin coating is reduced, and an effect of suppressing the bulges of the outer peripheral portions of the first light irradiation surface C1 and the second light irradiation surface C2 may be reduced. Meanwhile, when the width W of each of the gradients 11C and 21C exceeds 10 mm, a gradient is formed on an inner side of a radius where the film thickness of the adhesive sharply increases, and an extra space not involved in the space for storing the adhesive is formed.

The height H and the width W of each of the gradients 11C and 21C are determined as follows. First, the optical recording medium 1 is cut, and a sample piece is collected. This sample piece is observed with a cross-sectional scanning electron microscope (SEM) to obtain a cross-sectional SEM image. Subsequently, the height H and the width W of each of the gradients 11C and 21C are determined from the obtained cross-sectional SEM image.

The first surface 11A of the substrate 11 and the first surface 21A of the substrate 21 are, for example, uneven surfaces, and the information signal layers L0 are formed on the uneven surfaces. Hereinafter, a recess of the uneven surface is referred to as a land Ld, and a protrusion of the uneven surface is referred to as a groove Gv.

Examples of the shapes of the land Ld and the groove Gv include various shapes such as a spiral shape and a concentric shape. Furthermore, the land Ld and/or the groove Gv may be wobbled (meandered) in order to stabilize a linear velocity, add address information, or the like.

The outer diameter (diameter) of each of the substrates 11 and 21 is selected to be 120 mm, for example. The inner diameter (diameter) of each of the substrates 11 and 21 is selected to be 15 mm, for example. The thickness of the substrate 11 is selected in consideration of rigidity, and is preferably 0.3 mm or more and 0.6 mm or less, more preferably 0.3 mm or more and 0.545 mm or less, and still more preferably 0.445 mm or more and 0.545 mm or less.

Examples of materials of the substrates 11 and 21 include a plastic material and glass. The plastic material is preferably used from a viewpoint of moldability. Examples of the plastic material include a polycarbonate-based resin, a polyolefin-based resin, an acrylic resin, and the like. Furthermore, a polycarbonate-based resin is often used from a viewpoint of cost.

(Adhesive Layer)

The adhesive layer 30 includes a cured ultraviolet curable resin, for example, at least one of an acrylic resin and an epoxy resin. With the adhesive layer 30, the first disk 10 and the second disk 20 are bonded to each other. More specifically, the second surface 11B of the substrate 11 included in the first disk 10 and the second surface 21B of the substrate 21 included in the second disk 20 are bonded to each other with the adhesive layer 30 so as to face each other with the adhesive layer 30 interposed therebetween. The substrate 11 of the first disk 10 and the substrate 21 of the second disk substrate are bonded to each other such that each of the cover layers 12 and 22 is on a front surface side. The thickness of the adhesive layer 30 is, for example, 0.01 mm or more and 0.22 mm or less. The adhesive layer 30 has an annular shape, and the thickness of an outer peripheral portion of the adhesive layer 30 is larger than the thickness of an inner peripheral portion of the adhesive layer 30. A reason for having such a thickness relationship is that the adhesive constituting the adhesive layer 30 is stretched by a spin coating method as described later.

(Information Signal Layer)

The information signal layer L has a recessed track (hereinafter referred to as "land track") and a protruded track (hereinafter referred to as "groove track"). The optical recording medium 1 according to the present embodiment can record an information signal on both the land track and the groove track A pitch Tp between the land track and the groove track is preferably 0.225 nm or less from a viewpoint of high recording density.

Figure 4:
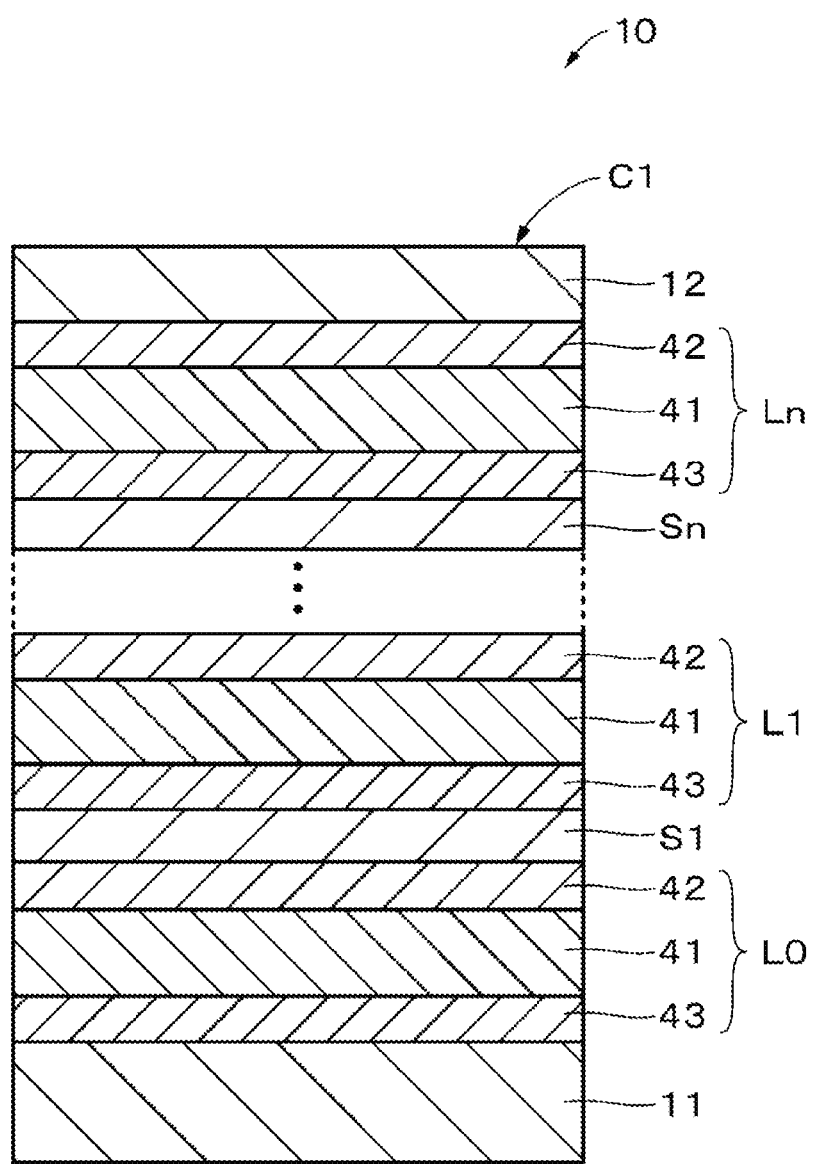
FIG. 4 is a cross-sectional view illustrating an example of a configuration of each of information signal layers illustrated in FIG. 3.

As illustrated in FIG. 4, the information signal layers L0 to Ln each include a recording layer 41 having an upper surface (first surface) and a lower surface (second surface), a dielectric layer 42 disposed adjacent to the upper surface of the recording layer 41, and a dielectric layer 43 disposed adjacent to the lower surface of the recording layer 41. With such a configuration, durability of the recording layer 41 can be improved. Here, the upper surface refers to a surface on a side irradiated with laser light for recording or reproducing an information signal out of both surfaces of the recording layer 41. The lower surface refers to the opposite surface to the above-described side irradiated with laser light, that is, a surface on the substrate 11 side. Note that the configuration of the information signal layers L0 to Lm can be similar to that of the information signal layers L0 to Ln, and therefore description thereof is omitted.

(Recording Layer)

The recording layer 41 is a so-called inorganic recording layer. The recording layer 41 in at least one of the information signal layers L1 to Ln other than the information signal layer L0 located at the innermost position with respect to the first light irradiation surface C1 contains, for example, an oxide of metal A, an oxide of metal B, and an oxide of metal C as a main component. Metal A is at least one of W, Mo, and Zr, metal B is Mn, and metal C is at least one of Cu, Ag, and Ni. The ratio of metal A contained in the oxide of metal A, the ratio of metal B contained in the oxide of metal B, and the ratio of metal C contained in the oxide of metal C each satisfy a relationship of $0.46 \le x1$, preferably $0.46 \le x1 \le 1.70$. As a result, excellent transmission characteristics can be achieved while characteristics required for the information signal layer L of the optical recording medium 1 are satisfied. Here, examples of the characteristics required for the information signal layer L of the optical recording medium 1 include good signal characteristics, a high recording power margin, high reproduction durability, and the like.

Provided that x1 is a variable defined by $x1=a/(b+0.8c)$.
- a: Atomic ratio of metal A to the sum of metal A, metal B, and metal C [atomic %]
- b: Atomic ratio of metal B to the sum of metal A, metal B, and metal C [atomic %]
- c: Atomic ratio of metal C to the sum of metal A, metal B, and metal C [atomic %]

All of the recording layers 41 included in the information signal layers L1 to Ln other than the information signal layer L0 preferably each contain the ternary oxide described above as a main component and satisfies the relationship ($0.46 \le x1$) described above from a viewpoint of increasing the amount of light reaching the information signal layer L0 located at the innermost position with respect to the first light irradiation surface C1. Furthermore, generally, an information signal layer L closer to the information signal layer L0 located at the innermost position requires higher recording sensitivity, and therefore tends to have lower transmittance. For this reason, a design is often made such that an information signal layer L closer to the first light irradiation surface C1 has higher transmittance. Therefore, the value of the variable x1 of the recording layer 41 of each of the information signal layers L1 to Ln is preferably larger as an information signal layer L is closer to the first light irradiation surface C1.

Furthermore, all of the recording layers 41 included in the information signal layers L0 to Ln preferably each contain the ternary oxide described above as a main component and satisfies the relationship ($0.46 \le x1$) described above from a viewpoint of obtaining good signal characteristics, a high recording power margin, and high reproduction durability. Furthermore, the value of the variable x1 of the recording layer 41 of each of the information signal layers L0 to Ln is preferably larger as an information signal layer L is closer to the first light irradiation surface C1. This is because the transmittance of an information signal layer L closer to the first light irradiation surface C1 can be increased.

The atomic ratio a of metal A to the sum of metal A, metal B, and metal C is preferably in a range of 10 atomic % or more and 70 atomic % or less, and more preferably in a range of 33 atomic % or more and 68 atomic % or less. When the atomic ratio a is less than 10 atomic %, transmittance tends to be low. Meanwhile, when the atomic ratio a exceeds 70 atomic %, recording sensitivity tends to decrease.

The atomic ratio b of metal B to the sum of metal A, metal B, and metal C is preferably in a range of 2 atomic % or more and 40 atomic % or less, and more preferably in a range of 5 atomic % or more and 30 atomic % or less. When the atomic ratio b is less than 2 atomic %, a recording power margin tends to be narrowed. Meanwhile, when the atomic ratio b exceeds 40 atomic %, transmittance tends to be low.

The atomic ratio c of metal C to the sum of metal A, metal B, and metal C is preferably in a range of 5 atomic % or more and 50 atomic % or less, and more preferably in a range of 27 atomic % or more and 37 atomic % or less. When the atomic ratio c is less than 5 atomic %, reproduction durability tends to be weak. Meanwhile, when the atomic ratio c exceeds 50 atomic %, transmittance tends to be low.

As a material of the recording layer 41 other than the ternary oxide described above in the information signal layers L1 to Ln, for example, a mixture of In oxide and Pd oxide or a mixture of W oxide and Pd oxide can be used. However, in order to reduce cost of the optical recording medium 1, the above-described ternary oxide not containing Pd that is a noble metal is preferably used as a material of the recording layer 41.

As a material of the recording layer 41 of the information signal layer L0 located at the innermost position with respect to the first light irradiation surface C1, a mixture of In oxide and Pd oxide or a mixture of W oxide and Pd oxide can also be used. However, the ternary oxide described above is preferably used as a material of the recording layer 41 from a viewpoint of cost reduction.

The thickness of the recording layer 41 is preferably in a range of 25 nm or more and 60 nm or less, and more preferably in a range of 30 nm or more and 50 nm or less. When the thickness of the recording layer 41 is less than 25 nm, signal characteristics tend to deteriorate. Meanwhile, when the thickness of the recording layer 41 exceeds 60 nm, a recording power margin tends to be narrowed.

(Dielectric Layer)

The dielectric layers 42 and 43 each function as an oxygen barrier layer. As a result, durability of the recording layer 41 can be improved. Furthermore, by suppressing escape of oxygen in the recording layer 41, a change in the film quality of the recording layer 41 (mainly detected as a decrease in reflectance) can be suppressed, and the film quality required for the recording layer 41 can be secured. Moreover, by disposing the dielectric layers 42 and 43, recording characteristics can be improved. It is considered that this is because thermal diffusion of laser light incident on the dielectric layers 42 and 43 is optimally controlled to suppress generation of too large bubbles in a recording portion and acceleration of decomposition of Mn oxide to collapse the bubbles, and the shapes of bubbles at the time of recording can be optimized.

The optical film thickness (optical path length) n×T of the dielectric layer 43 (provided that n is the refractive index of the dielectric layer 43, and T is the physical film thickness of the dielectric layer 43) preferably satisfies a relationship of n×T≥32 nm. This is because a tracking offset can be suppressed when an information signal is recorded (land/groove recording) in the land Ld as a recess and the groove Gv as a protrusion.

Materials of the dielectric layers 42 and 43 each include, for example, at least one selected from the group consisting of an oxide, a nitride, a sulfide, a carbide, and a fluoride. As the materials of the dielectric layers 42 and 43, the same material or different materials can be used. Examples of the oxide include an oxide of one or more elements selected from the group consisting of In, Zn, Sn, Al, Si, Ge, Ti, Ga, Ta, Nb, Hf, Zr, Cr, Bi, and Mg. Examples of the nitride include a nitride of one or more elements selected from the group consisting of In, Sn, Ge, Cr, Si, Al, Nb, Mo, Ti, Nb, Mo, Ti, W, Ta, and Zn. Preferable examples thereof include a nitride of one or more elements selected from the group consisting of Si, Ge, and Ti. Examples of the sulfide include Zn sulfide. Examples of the carbide include a carbide of one or more elements selected from the group consisting of In, Sn, Ge, Cr, Si, Al, Ti, Zr, Ta, and W. Preferable examples thereof include a carbide of one or more elements selected from the group consisting of Si, Ti, and W. Examples of the fluoride include a fluoride of one or more elements selected from the group consisting of Si, Al, Mg, Ca, and La. Examples of a mixture of these compounds include $ZnS$—$SiO_2$, $SiO_2$—$In_2O_3$—$ZrO_2$(SIZ), $SiO_2$—$Cr_2O_3$—$ZrO_2$ (SCZ), $In_2O_3$—$SnO_2$(ITO), $In_2O_3$—$CeO_2$(ICO), $In_2O_3$—$Ga_2O_3$(IGO), $In_2O_3$—$Ga_2O_3$—$ZnO$(IGZO), $Sn_2O_3$—$Ta_2O_5$ (TTO), $TiO_2$—$SiO_2$, $Al_2O_3$—$ZnO$, $Al_2O_3$—$BaO$, and the like.

The thickness of the dielectric layer 43 is preferably in a range of 2 nm or more and 30 nm or less. When the thickness of the dielectric layer 43 is less than 2 nm, a barrier effect tends to be small. Meanwhile, when the thickness of the dielectric layer 43 exceeds 30 nm, a recording power margin tends to decrease (deteriorate).

The thickness of the dielectric layer 42 is preferably in a range of 2 nm or more and 50 nm or less. When the thickness of the dielectric layer 42 is less than 2 nm, a barrier effect tends to be small. Meanwhile, when the thickness of the dielectric layer 42 exceeds 50 nm, a recording power margin tends to decrease (deteriorate).

In a case where the number of the information signal layers L in each of the first disk 10 and the second disk 20 is three, as the information signal layers L0 to L2, a combination of layers having the following configurations is preferably used. The recording layer 41 of the information signal layer L1 requiring high sensitivity and close to the innermost layer having a small value of x1 tends to contain a large amount of Mn or Cu, and therefore tends to have a large fluctuation in transmittance after recording. For this reason, the dielectric layers 42 and 43 each having an extinction coefficient of 0.05 or more are preferably used to suppress the fluctuation in transmittance. Furthermore, the recording layer 41 of the information signal layer L2 requiring high transmittance and having a large value of x1 tends to have a narrow power margin although having a small change in transmittance after recording.

Therefore, the dielectric layers 42 and 43 preferably each contain SIZ or IGZO to secure a power margin.

Information signal layer L0
Dielectric layer 42: SIZ
Recording layer 41: WCOM ($0.3≤x1≤0.5$)
Dielectric layer 43: ITO
Information signal layer L1
Dielectric layer 42: SIZ
Recording layer 41: WCOM ($0.6≤x1≤1.0$)
Dielectric layer 43: SIZ
Information signal layer L2
Dielectric layer 42: SIZ
Recording layer 41: WCOM ($0.9≤x1≤1.4$)
Dielectric layer 43: SIZ Note that here, "WCMO" means a mixture of three components of W oxide, Mn oxide, and Cu oxide.

In the optical recording medium 1 according to the present embodiment, when the recording layer 41 is irradiated with laser light, Mn oxide is heated by the laser light and decomposes to release oxygen, and bubbles are generated in a portion irradiated with the laser light. As a result, an information signal can be recorded irreversibly.

(Intermediate Layer)

Each of the intermediate layers S1 to Sn and S1 to Sm separates the information signal layers L0 to Ln and L0 to Lm from one another with a sufficient physical and optical distance, and has an uneven surface on a front surface thereof. The uneven surface forms, for example, concentric or spiral lands Ld and grooves Gv. The thicknesses of each of the intermediate layers S1 to Sn and S1 to Sm is preferably 9 μm or more and 50 μm or less.

The intermediate layers S1 to Sn and S1 to Sm each include a cured ultraviolet curable resin, for example, at least one of an acrylic resin and an epoxy resin. Furthermore, the intermediate layers S1 to Sn and S1 to Sm each serve as an optical path of laser light for recording and reproducing data in an inner layer, and therefore preferably has a sufficiently high light transmitting property.

(Cover Layer)

The cover layers 12 and 22 each include a cured ultraviolet curable resin, for example, at least one of an acrylic resin and an epoxy resin. The cover layers 12 and 22 preferably each have a thickness of 10 μm or more and 177 μm or less, for example, 57 μm. By combining such thin cover layers 12 and 22 with an objective lens having a high numerical aperture (NA) of, for example, about 0.85, high-density recording can be achieved.

The total thickness of the cover layer 12 and the intermediate layers S1 to Sn in the first disk 10 is preferably 30 μm or more and 110 μm or less. Similarly, the total thickness of the cover layer 22 and the intermediate layers S1 to Sm in the second disk 20 is preferably 30 μm or more and 110 μm or less.

(Hard Coat Layer)

The hard coat layer is for imparting scratch resistance and the like to the first light irradiation surface C1 and the second light irradiation surface C2. Examples of a material for the hard coat layer include an acrylic resin, a silicone-based resin, a fluorine-based resin, an organic-inorganic hybrid resin, and the like. The hard coat layer may contain silica gel fine powder in order to improve mechanical strength.

(Example of Thickness of Each Layer in a Case where the Number of Information Signal Layers is Three or Four)

In a case where the first disk 10 has three information signal layers L, the total thickness of the cover layer 12, the intermediate layer S1, and the intermediate layer S2 in the first disk 10 is preferably 94 μm or more and 106 μm or less, for example, 100 μm. The thickness of the intermediate layer S1 is preferably 20 μm or more and 30 μm or less, for example, 25 μm or less. The thickness of the intermediate layer S2 is preferably 13 μm or more and 23 μm or less, for example, 18 μm.

Note that in a case where the second disk 20 has three information signal layers L, the total thickness of the cover layer 22, the intermediate layer S1, and the intermediate layer S2, the thickness of the intermediate layer S1, and the thickness of the intermediate layer S2 in the second disk 20 are similar to the total thickness of the cover layer 12, the intermediate layer S1, and the intermediate layer S2, the thickness of the intermediate layer S1, and the thickness of the intermediate layer S2 in the first disk 10 described above, respectively.

In a case where the first disk 10 has four information signal layers L, the total thickness of the cover layer 22, the intermediate layer S1, the intermediate layer S2, and the intermediate layer S3 in the first disk 10 is preferably 94 μm or more and 106 μm or less, for example, 100 μm. The thickness of the intermediate layer S1 is preferably 11 μm or more and 20.5 μm or less, for example, 15.5 μm. The thickness of the intermediate layer S2 is preferably 14.5 μm or more and 24.5 μm or less, for example, 19.5 μm. The thickness of the intermediate layer S3 is preferably 10 μm or more and 16.5 μm or less, for example, 11.5 μm.

Note that in a case where the second disk 20 has four information signal layers L, the total thickness of the cover layer 22, the intermediate layer S1, the intermediate layer S2, and the intermediate layer S3, the thickness of the intermediate layer S1, the thickness of the intermediate layer S2, and the thickness of the intermediate layer S3 in the second disk 20 are similar to the total thickness of the cover layer 12, the intermediate layer S1, the intermediate layer S2, and the intermediate layer S3, the thickness of the intermediate layer S1, the thickness of the intermediate layer S2, and the thickness of the intermediate layer S3 in the first disk 10 described above, respectively.

[Configuration of Die]

An example of a configuration of a die 50 used for injection molding of the substrates 11 and 21 described above will be described with reference to FIGS. 5A and 5B.

The die 50 includes a fixing side die (first die) 51 and a movable side die (second die) 52 facing the fixing side die 51, and a cavity 53 that is a molding space is formed by causing the fixing side die 51 and the movable side die 52 to butt against each other. Molten resin is filled in the cavity 53.

The fixing side die 51 includes a signal surface mirror (mirror plate) 51A disposed so as to face the movable side die 52, a sprue 51B for supplying resin to the cavity 53, and a stamper presser 51C for supporting an outer periphery of a stamper 54.

The fixing side mirror 51A has a circular mirror surface (first molding surface) 51As facing the movable side die 52. The stamper 54 is attached to the mirror surface 51As. The stamper 54 has, for example, an annular shape having an opening in the center, and a molding surface 54As of the stamper 54 has a fine uneven shape for transferring the shape of the land Ld, the shape of the groove Gv, and the like to the substrates 11 and 21. The stamper 54 is a Ni master disk containing, for example, nickel (Ni) or the like as a main component.

A hard film is preferably disposed on the mirror surface 51As in order to reduce a friction coefficient of a front surface. The hard film preferably contains, for example, a highly hard material such as diamond like carbon (DLC), titanium nitride (TiN), chromium nitride (CrN), titanium carbonitride (TiCN), titanium aluminum nitride (TiAlN), or ticron (TiCrN).

The sprue 51B is disposed in a central portion of the fixing side mirror 51A. The sprue 51B is connected to a material supply device (not illustrated). Molten resin that is a substrate material is supplied from the material supply device into the cavity 53 via the sprue 51B.

The movable side die 52 is disposed so as to face the fixing side die 51 and can be moved close to and away from the fixing side die 51. The movable side die 52 includes a bonding surface mirror (mirror plate) 52A disposed so as to face the fixing side die 51, a gate cut punch 52B for cutting a central portion of the substrate 11 or the substrate 21 solidified in the cavity 53, an extrusion pin 52C for extruding a portion cut by the gate cut punch 52B, and a movable side ejector 52D for releasing the substrate 11 or the substrate 21 from the movable side die 52.

The movable side mirror 52A has a circular mirror surface (second molding surface) 52As facing the fixing side die 51. As illustrated in FIG. 5B, a gradient 52Aa is formed on an outer peripheral portion of the mirror surface 52As. The gradient 52Aa is inclined so as to rise in a radial direction. Here, the radial direction means a direction from the center of the mirror surface 51As toward the outer periphery. The height h of the gradient 52Aa is preferably 50 μm or less, more preferably 10 μm or more and 50 μm or less, still more preferably 10 μm or more and 30 μm or less, and particularly preferably 10 μm or more and 20 μm or less. When the height h of the gradient 52Aa is 50 μm or less, it is possible to suppress the amount of fluctuation in bulge in the radial direction at the outer peripheral portions of the first light irradiation surface C1 and the second light irradiation surface C2.

The width w of the gradient 52Aa in the radial direction is preferably 5 mm or more and 10 mm or less, and more preferably 6 mm or more and 8 mm or less. When the width W of the gradient 52Aa is less than 5 mm, a space for storing the adhesive stretched by spin coating is reduced, and an effect of suppressing the bulges of the outer peripheral portions of the first light irradiation surface C1 and the second light irradiation surface C2 may be reduced. Meanwhile, when the width W of the gradient 52Aa exceeds 10 mm, a gradient is formed on an inner side of a radius where the film thickness of the adhesive sharply increases, and an extra space not involved in the space for storing the adhesive is formed.

The gate cut punch 52B cuts a runner portion and the like of the resin supplied from the sprue 51B into the cavity 53 and solidified, and has an outer diameter substantially the same as the center hole of the optical recording medium. The gate cut punch 52B is movable in a direction protruding into the cavity 53 by a guide means or a drive means (not illustrated).

The extrusion pin 52C has a rod-like shape and is disposed in a central portion of the gate cut punch 52B. The extrusion pin 52C is movable in a direction protruding into the cavity 53 by a guide means and a drive means (not illustrated), and removes a portion cut by the gate cut punch 52B described above. Therefore, after the molten resin filled in the cavity 53 is solidified, by extruding the extrusion pin 52C, the runner portion and the sprue portion can be removed.

The movable side ejector 52D has a cylindrical shape having an inner diameter with substantially the same size as the outer diameter of the gate cut punch 52B, and is disposed so as to surround the gate cut punch 52B. This movable side ejector 52D is movable in a direction protruding into the cavity 53 by a guide means or a drive means (not illustrated). Therefore, the molten resin is filled in the cavity 53, and the center hole of the substrate 11 or the substrate 21 is formed as described above. Thereafter, the inner peripheral side of the substrate 11 or the substrate 21 is pressed by the movable side ejector 52D to release the substrate 11 or the substrate 21 from the movable side die 52.

[Operation of Die]

Next, an example of operation of the die 50 having the above configuration will be described. First, the movable side die 52 is moved in a direction approaching the fixing side die 51, and the fixing side die 51 and the movable side die 52 are caused to butt against each other to form the cavity 53 with the mirror surface 51As and the mirror surface 52As. Next, molten resin is filled in the cavity 53. This resin is heated and melted in a material supply device (not illustrated), and is supplied into the cavity 53 using the sprue 51B as a supply path. Examples of the resin include a polycarbonate-based resin, a polyolefin-based resin, and an acrylic resin.

Next, the resin filled in the cavity 53 is cooled and solidified, and the resin is subjected to mold clamping. Note that when the resin is subjected to mold clamping, the movable side die 52 is moved in a direction further approaching the fixing side die 51. As a result, the resin filled in the cavity 53 is pressurized, and the uneven shape formed on the molding surface 54As of the stamper 54 is more reliably transferred.

Next, the resin is sufficiently cooled and solidified. Thereafter, the gate cut punch 52B is moved in a direction approaching the fixing side die 51, that is, in a direction protruding into the cavity 53. By moving the gate cut punch 52B in a direction protruding into the cavity 53, the runner portion and the sprue portion of the solidified molded body can be cut. As a result, after the molten resin filled in the cavity 53 is solidified, an opening is formed in a central portion.

Next, the movable side die 52 is moved in a direction separated from the fixing side die 51. As a result, the solidified substrate 11 or substrate 21 is separated from the stamper 54 attached to the fixing side die 51, and one surface thereof is exposed to the outside.

Next, by moving the extrusion pin 52C in a direction protruding into the cavity 53, a portion cut by the gate cut punch 52B described above is removed. Next, by moving the movable side ejector 52D in a direction protruding into the cavity 53, an inner peripheral portion of the substrate 11 or the substrate 21 is pressed to release the substrate 11 or the substrate 21 from the movable side die 52. Through the above steps, the desired substrate 11 or substrate 21 is obtained.

[Method for manufacturing optical recording medium]

An example of a method for manufacturing the optical recording medium 1 according to an embodiment of the present disclosure will be described with reference to FIGS. 6A, 6B, 6C, 6D, 7A, 7B, and 7C.

(First Disk Manufacturing Step)

The first disk 10 is manufactured as follows.

(Substrate molding step)

Figure 5A:
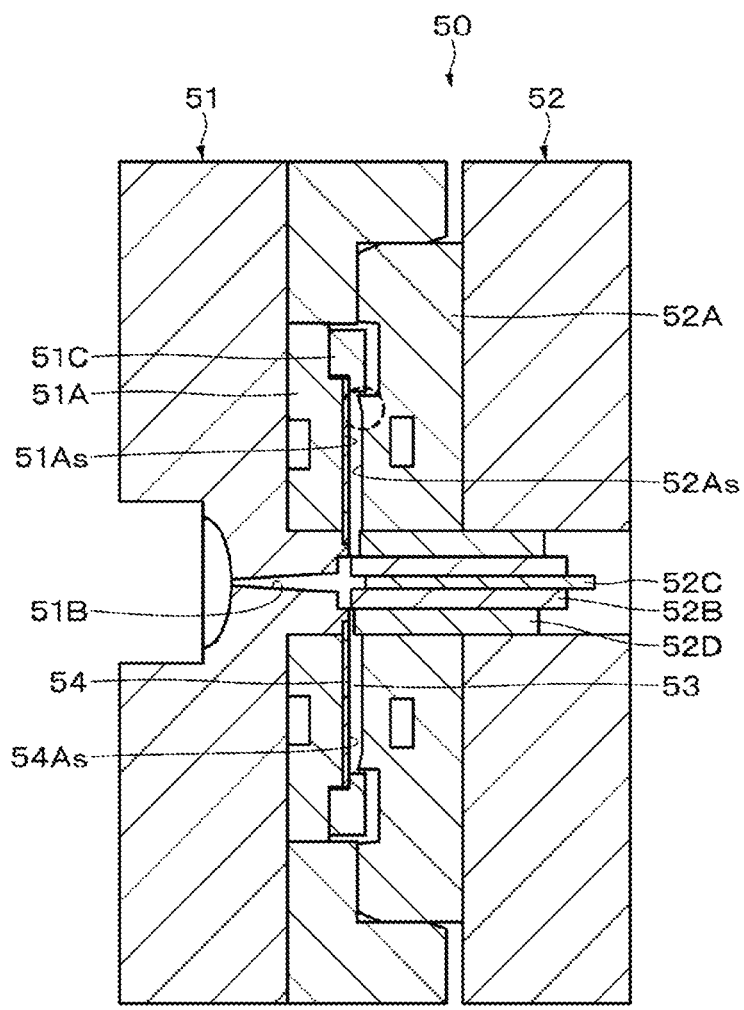
FIG. 5A is a cross-sectional view illustrating an example of a configuration of a die.
Figure 5B:
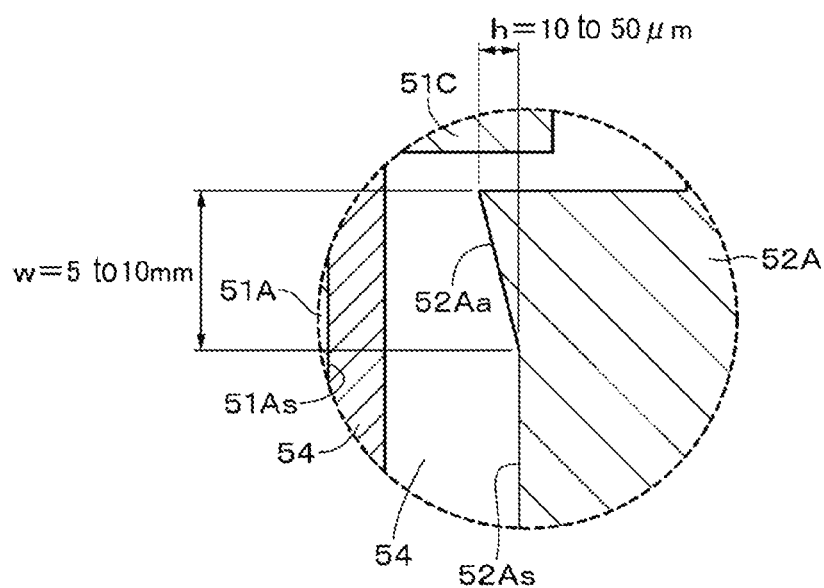
FIG. 5B is an enlarged cross-sectional view illustrating a part of FIG. 5A.

First, the substrate 11 having an uneven surface on one surface thereof is formed using an injection molding apparatus including the die illustrated in FIGS. 5A and 5B.

(Information Signal Layer Forming Step)

Next, by sequentially laminating the dielectric layer 43, the recording layer 41, and the dielectric layer 42 on the substrate 11, for example, by a sputtering method, the information signal layer L0 is formed. Hereinafter, a step of forming the dielectric layer 43, the recording layer 41, and the dielectric layer 42 will be specifically described.

(Dielectric Layer Forming Step)

First, the substrate 11 is conveyed into a vacuum chamber including a target containing a dielectric material as a main component, and the inside of the vacuum chamber is evacuated until a predetermined pressure is reached. Thereafter, while process gas such as Ar gas or $O_2$ gas is introduced into the vacuum chamber, the target is sputtered to form the dielectric layer 43 on the substrate 11. Examples of the sputtering method include a radio frequency (RF) sputtering method and a direct current (DC) sputtering method, and the direct current sputtering method is particularly preferable. This is because the direct current sputtering method has a higher film formation rate than the radio frequency sputtering method, and therefore can improve productivity.

(Inorganic Recording Layer Forming Step)

Next, the substrate 11 is conveyed into a vacuum chamber including a target for forming an inorganic recording layer, and the inside of the vacuum chamber is evacuated until a predetermined pressure is reached. Thereafter, while process gas such as Ar gas or $O_2$ gas is introduced into the vacuum chamber, the target is sputtered to form the recording layer 41 on the dielectric layer 43.

Here, the target for forming an inorganic recording layer contains, for example, a ternary oxide of an oxide of metal A, an oxide of metal B, and an oxide of metal C as a main component. The ratio of each of metal A, metal B, and metal C contained in the ternary oxide satisfies a relationship of $0.46 \leq x1$, preferably $0.46 \leq x1 \leq 1.70$. Note that x1 is a variable defined by $x1=a/(b+0.8c)$ as described above.

The ternary oxide of the target for forming an inorganic recording layer preferably has a similar composition to that of the recording layer 41.

Furthermore, the recording layer 41 may be formed by reactive sputtering with at least oxygen. In this case, the target for the optical recording medium contains metal A, metal B, and metal C as a main component, and the ratio of each of metal A, metal B, and metal C satisfies a relationship of $0.46 \leq x1$, preferably $0.46 \leq x1 \leq 1.70$. Note that x1 is a variable defined by $x1=a/(b+0.8c)$ as described above.

(Dielectric Layer Forming Step)

Next, the substrate 11 is conveyed into a vacuum chamber including a target containing a dielectric material as a main component, and the inside of the vacuum chamber is evacuated until a predetermined pressure is reached. Thereafter, while process gas such as Ar gas or $O_2$ gas is introduced into the vacuum chamber, the target is sputtered to form the dielectric layer 42 on the recording layer 41. Examples of the sputtering method include a radio frequency (RF) sputtering method and a direct current (DC) sputtering method, and the direct current sputtering method is particularly preferable. This is because the direct current sputtering method has a higher film formation rate than the radio frequency sputtering method, and therefore can improve productivity.

As a result, the information signal layer L0 is formed on the substrate 11.

(Intermediate Layer Forming Step)

Next, an ultraviolet curable resin is uniformly applied onto the information signal layer L0, for example, by a spin coating method. Thereafter, an uneven pattern of a stamper is pressed against the ultraviolet curable resin uniformly applied onto the information signal layer L0, and the ultraviolet curable resin is irradiated with ultraviolet rays to be cured. Thereafter, the stamper is peeled off. As a result, the uneven pattern of the stamper is transferred onto the ultraviolet curable resin, and the intermediate layer S1 having, for example, lands Ld and grooves Gv is formed on the information signal layer L0. The ultraviolet curable resin is, for example, at least one of an acrylic ultraviolet curable resin and an epoxy-based ultraviolet curable resin.

(Step of Forming Information Signal Layer and Intermediate Layer)

Next, the information signal layer L1, the intermediate layer S2, the information signal layer L3, . . . , the intermediate layer Sn, and the information signal layer Ln are laminated in this order on the intermediate layer S1 in a similar manner to the step of forming the information signal layer L0 and the intermediate layer S1 described above.

(Cover Layer Forming Step)

Next, an ultraviolet curable resin is spin coated on the information signal layer Ln, for example, by a spin coating method. Thereafter, the ultraviolet curable resin is irradiated with ultraviolet rays to be cured. As a result, the cover layer 12 is formed on the information signal layer Ln. The ultraviolet curable resin is, for example, at least one of an acrylic ultraviolet curable resin and an epoxy-based ultraviolet curable resin. As a result, the first disk 10 is manufactured.

(Second Disk Manufacturing Step)

Since the second disk 20 manufacturing step is similar to the first disk 10 manufacturing step described above, description thereof is omitted.

(Bonding Step)

As illustrated below, an ultraviolet curable resin as an adhesive is stretched between the first disk 10 and the second disk 20 manufactured as described above, and temporarily cured. The ultraviolet curable resin is, for example, at least one of an acrylic ultraviolet curable resin and an epoxy-based ultraviolet curable resin. Here, "temporarily cured" means that the adhesive is partially cured (sometimes referred to as "semi-cured") to such an extent that the first disk 10 and the second disk 20 are not peeled off or shifted.

Figure 6A:
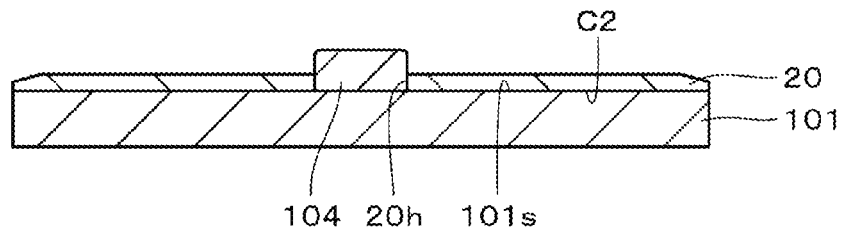
FIGS. 6A, 6B, 6C, and 6D are process diagrams for explaining an example of a method for manufacturing an optical recording medium according to an embodiment of the present disclosure.
Figure 6B:
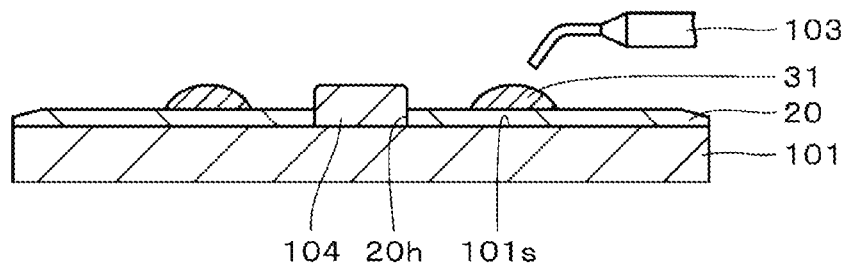

First, as illustrated in FIG. 6A, the second disk 20 is placed on a placement surface 101s of a press stage 101 such that a center hole 20h thereof is engaged with a center pin 104. At this time, the second disk 20 is placed such that the second light irradiation surface C2 is on the placement surface 101s side of the press stage 101. Next, as illustrated in FIG. 6B, an adhesive 31 is applied onto the inside of the center hole 20h in a ring shape with a dispenser 103.

Figure 6C:
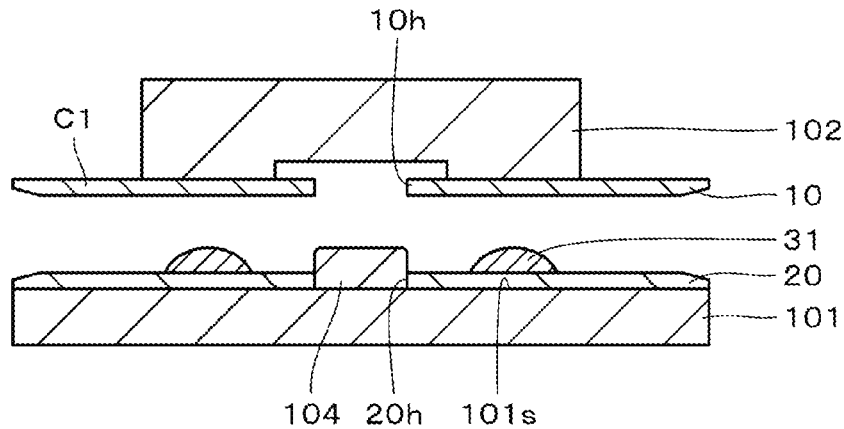
Figure 6D:
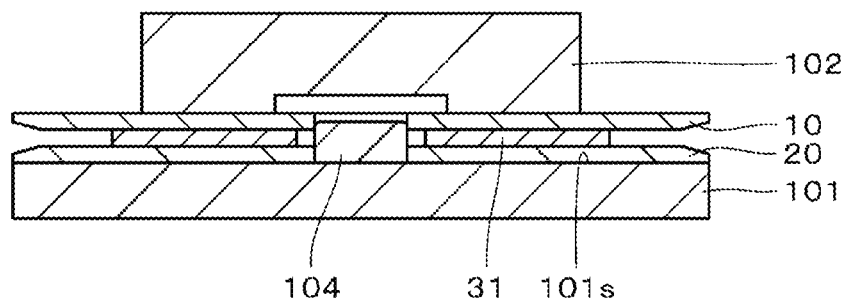

Next, as illustrated in FIG. 6C, a center hole 10h is engaged with the center pin 104 while the first light irradiation surface C1 of the first disk 10 is held by a press head 102. Next, as illustrated in FIG. 6D, the first disk 10 is pressed against the second disk 20 via the adhesive 31 with the press head 102 until the thickness of the adhesive 31 reaches a predetermined thickness, for example, about 50 μm.

Figure 7A:
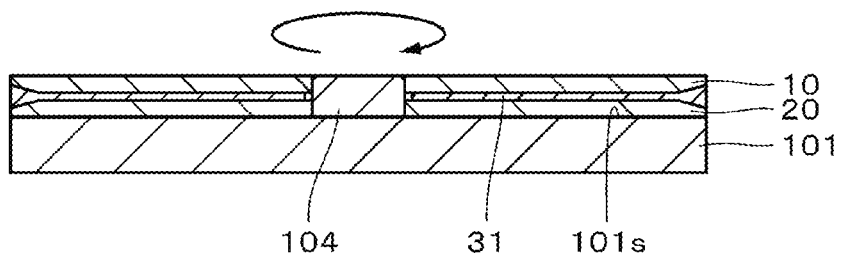
FIGS. 7A, 7B, and 7C are process diagrams for explaining an example of a method for manufacturing an optical recording medium according to an embodiment of the present disclosure.

Next, as illustrated in FIG. 7A, by rotating the press stage 101, the adhesive 31 sandwiched between the first disk 10 and the second disk 20 is stretched in the radial direction of the first disk 10 and the second disk 20. As a result, the adhesive 31 is distributed from the inner peripheral portions of the first disk 10 and the second disk 20 to the outer peripheral portions thereof.

Figure 7B:
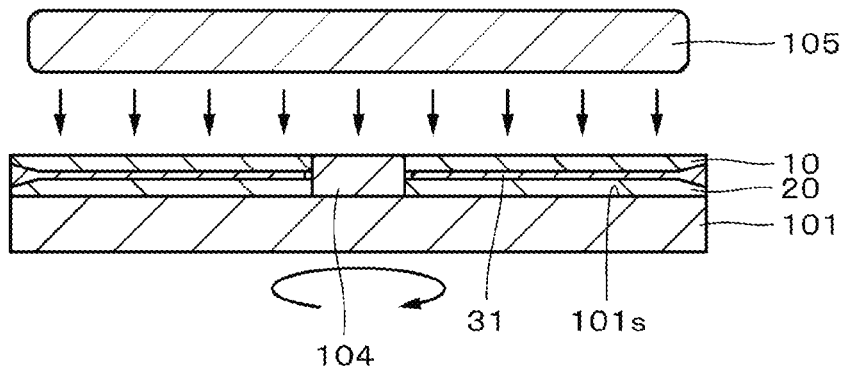

Next, as illustrated in FIG. 7B, by maintaining the rotation of the press stage 101, while the adhesive 31 is shaken off such that the thickness of the adhesive 31 is a predetermined thickness, the adhesive 31 is irradiated with ultraviolet rays from the first disk 10 side by an ultraviolet lamp 105 to temporarily cure the adhesive 31. As a result, the first disk 10 and the second disk 20 are fixed by the adhesive 31 in a state where the first disk 10 and the second disk 20 are maintained in substantially flat shapes by centrifugal force.

Figure 7C:
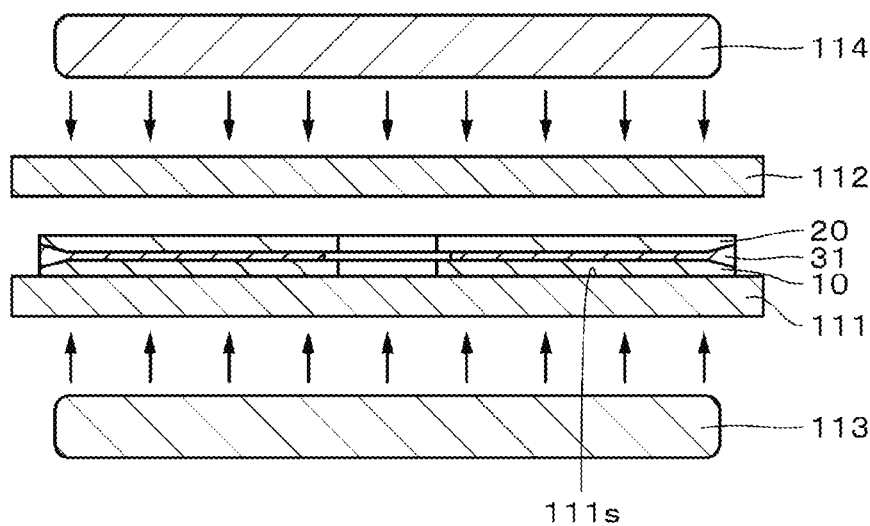

As illustrated below, the adhesive 31 that has been temporarily cured between the first disk 10 and the second disk 20 is fully cured. First, as illustrated in FIG. 7C, the first disk 10 and the second disk 20 fixed by the temporarily cured adhesive 31 are placed on a placement surface 111s of a quartz table 111. At this time, the first disk 10 and the second disk 20 are placed such that the second disk 20 is on the placement surface 111s side. Next, the placed first disk 10 and second disk 20 are covered with a quartz mask 112. Thereafter, the adhesive 31 is irradiated with ultraviolet rays from the first disk 10 side via the quartz table 111 by an ultraviolet lamp 113, and the adhesive 31 is irradiated with ultraviolet rays from the second disk 20 side via the quartz mask 112 by an ultraviolet lamp 114 to fully cure the adhesive 31. In this way, by irradiating the adhesive 31 with ultraviolet rays from both sides of the first disk 10 and the second disk 20 to fully cure the adhesive 31, it is possible to suppress generation of a warp in the obtained optical recording medium 1. Here, "fully cured" means that the adhesive 31 is completely cured. As a result, the target optical recording medium 1 is obtained.

[Effect]

In the optical recording medium 1 according to an embodiment, gradients 11C and 21C are formed on the outer peripheral portions of the second surfaces 11B and 21B on the adhesive layer 30 side out of both surfaces of the substrates 11 and 21, respectively. Therefore, a space for storing the adhesive 31 stretched by a spin coating method can be formed in the outer peripheral portions of the stacked substrates 11 and 21. Therefore, it is possible to suppress bulges formed on the outer peripheral portions of the first light irradiation surface C1 and the second light irradiation surface C2 of the optical recording medium 1.

EXAMPLES

Hereinafter, the present disclosure will be described specifically with Examples, but the present disclosure is not limited only to these Examples.

Examples 1 to 5

<First Disk Manufacturing Step>

A first disk was manufactured as follows. First, a disk-shaped polycarbonate substrate (hereinafter referred to as "PC substrate") having an outer diameter of 120 mm and a thickness of 0.53 mm was formed by injection molding. At this time, land portions and groove portions were formed on a first surface of the PC substrate, and a gradient was formed on an outer peripheral portion of a second surface of the PC substrate. As illustrated in Table 1, the height H of the gradient was set in a range of 10 µm to 70 µm. Furthermore, the width W of the gradient was set to 7 mm.

Next, a first dielectric layer, an inorganic recording layer, and a second dielectric layer were sequentially laminated on the first surface (uneven surface) of the polycarbonate substrate by a sputtering method to manufacture an L0 layer (first information signal layer). Next, an ultraviolet curable resin (manufactured by Dexerials Corporation, trade name: SK5500B) was uniformly applied onto the L0 layer by a spin coating method. An uneven pattern of a stamper was pressed against the ultraviolet curable resin applied onto the L0 layer, and the ultraviolet curable resin was irradiated with ultraviolet rays to be cured. Thereafter, the stamper was peeled off to form an S1 layer (first intermediate layer) having lands and grooves and having a thickness of 25 µm.

Next, a first dielectric layer, an inorganic recording layer, and a second dielectric layer were sequentially laminated on the uneven surface of the S1 layer described above to manufacture an L1 layer (second information signal layer). Next, an ultraviolet curable resin (manufactured by Dexerials Corporation, trade name: SK5500B) was uniformly applied onto the L1 layer by a spin coating method. An uneven pattern of a stamper was pressed against the ultraviolet curable resin applied onto the L1 layer, and the ultraviolet curable resin was irradiated with ultraviolet rays to be cured. Thereafter, the stamper was peeled off to form an S2 layer (second intermediate layer) having lands and grooves and having a thickness of 18 µm.

Next, a first dielectric layer, an inorganic recording layer, and a second dielectric layer were sequentially laminated on the uneven surface of the S2 layer described above to manufacture an L2 layer (third information signal layer). Next, an ultraviolet curable resin (manufactured by Dexerials Corporation, trade name: SK8300) was uniformly applied onto the L2 layer by a spin coating method. The ultraviolet curable resin was irradiated with ultraviolet rays to be cured to form a cover layer having a thickness of 57 µm. Note that the total thickness of the S1 layer, the S2 layer, and the cover layer was set to 100 µm. As a result, the first disk was obtained.

<Second Disk Manufacturing Step>

A second disk was obtained in a similar manner to the first disk manufacturing step described above.

<Bonding Step>

The first and second disks obtained as described above were bonded to each other as described in the embodiment described above. Note that an ultraviolet curable resin (manufactured by Dexerials Corporation, trade name: SK6880) was used as the adhesive. Furthermore, in an ultraviolet curable resin stretching step, as rotation conditions of a press stage, a rotation speed was set to 7000 rpm, and a rotation time was set to five seconds. As a result, a bonding type optical recording medium having the intended land/groove recording system was obtained.

Comparative Example 1

An optical recording medium was obtained in a similar manner to Example 1 except that the entire second surface was formed into a flat shape without forming a gradient in the outer peripheral portion of the second surface of the substrate in the step of manufacturing the first and second disks.

Comparative Example 2

Figure 8:
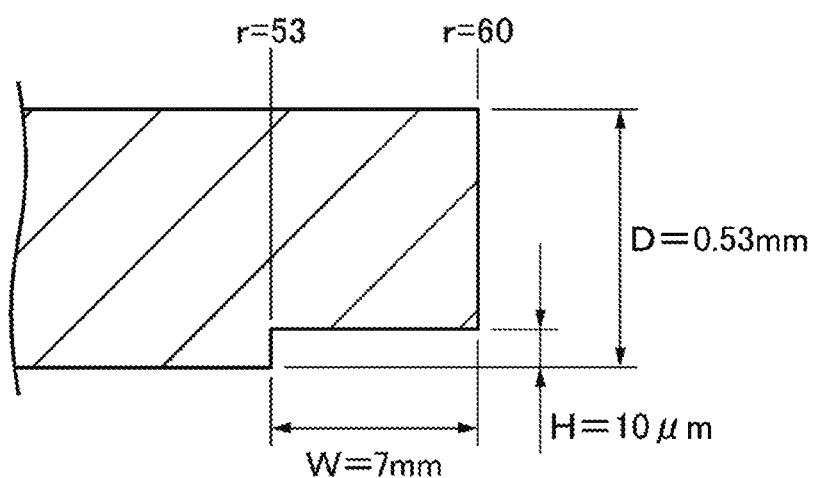
FIG. 8 is a cross-sectional view illustrating the shape of an outer peripheral portion of a substrate in Comparative Example 2.

In the step of manufacturing the first and second disks, a stepped depression was formed in the outer peripheral portion of the second surface of the substrate instead of forming a gradient as illustrated in FIG. 8. Note that the step H of the depression was set such that the volume of the stepped depression was the same as the volume of a space portion missing due to the gradient in Comparative Example 2. That is, the step H of the depression was set to half the height H of the gradient in Example 2, that is, 10 µm. An optical recording medium was obtained in a similar manner to Example 2 except for this.

[Evaluation]

(Thickness of Adhesive Layer)

The thickness of the adhesive layer of the optical recording medium in Comparative Example 1 was measured as follows. That is, the bonded first and second disks were peeled off, and a change in the thickness of the adhesive layer in the radial direction of the optical recording medium was measured.

Figure 9:
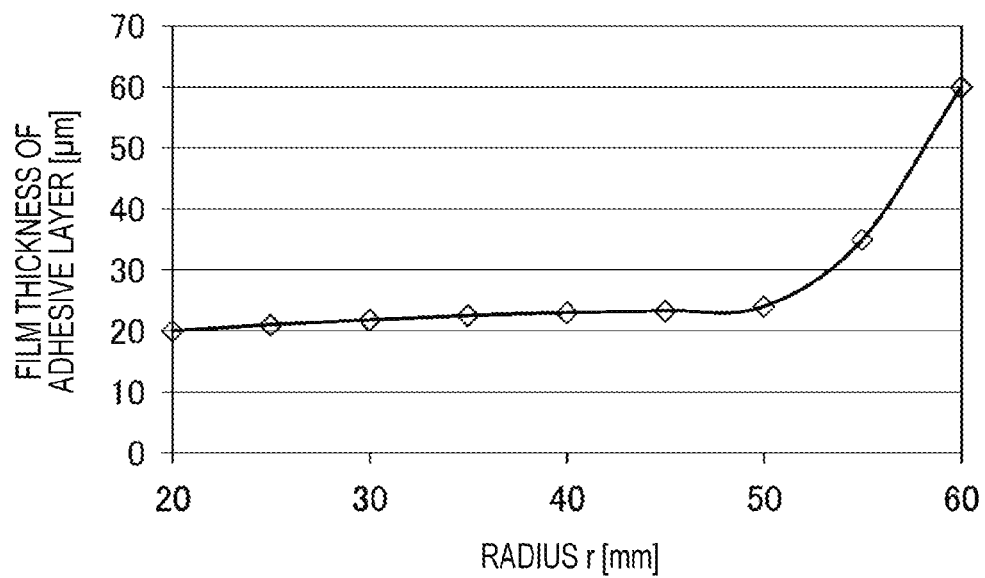
FIG. 9 is a graph illustrating radial dependency of the thickness of an adhesive layer in Comparative Example 1.

FIG. 9 illustrates the measurement result of the thickness of the adhesive layer. FIG. 9 indicates that the thickness of the adhesive layer is almost constant when the radius r is in a range of 0 to 50 mm, but tends to increase sharply when the radius r is in a range of 50 to 60 mm. Such a sharp increase in thickness is considered to be caused by surface tension acting on the adhesive on an outer peripheral side during spin coating, and a warp generated in the first and second disks in a single plate state.

(Inner Peripheral Average Value of Radial Tilts)

In the optical recording media in Example 2 and Comparative Example 1, an inner peripheral average value of the radial tilts (β angles) of the first and second light irradiation surfaces was measured as follows. That is, radial tilts [degree (hereinafter referred to as "deg")] over a range of one round were measured at a plurality of positions in a radius r of 24 to 58 mm, and an inner peripheral average value (average value in one round) of the radial tilts [deg] was calculated at each position. Note that here, the β angle (warp angle) is defined by an angle formed by incident light and reflected light (see FIG. 1A).

Figure 10A:
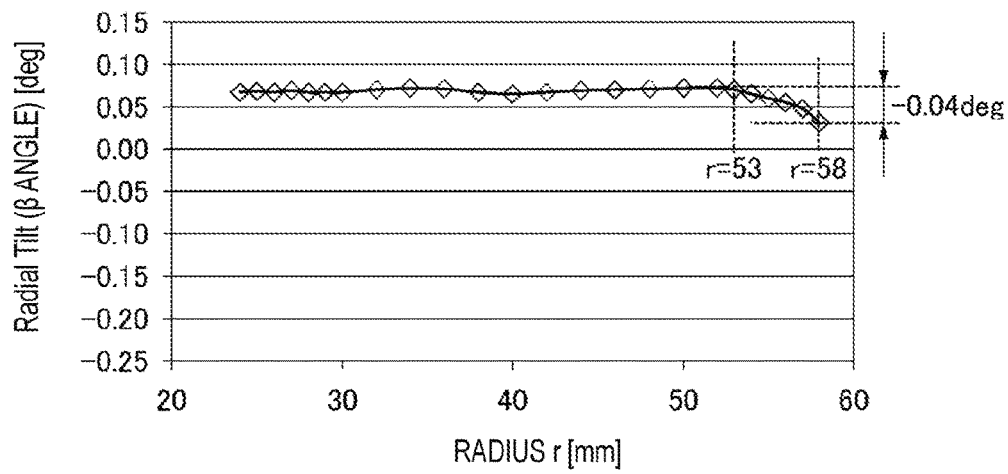
FIG. 10A is a graph illustrating radial dependency of a radial tilt (inner peripheral average value) of a first light irradiation surface in Example 2.
Figure 10B:
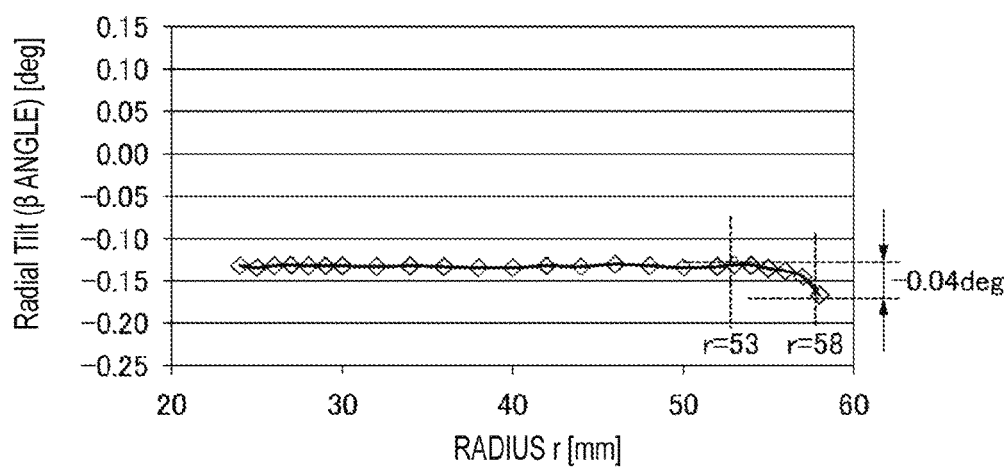
FIG. 10B is a graph illustrating radial dependency of a radial tilt (inner peripheral average value) of a second light irradiation surface in Example 2.
Figure 11A:
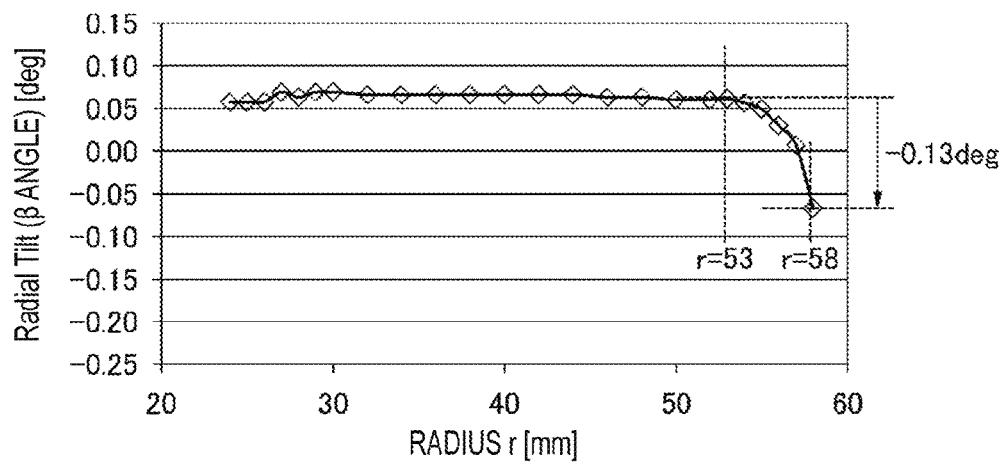
FIG. 11A is a graph illustrating radial dependency of a radial tilt (inner peripheral average value) of a first light irradiation surface in Comparative Example 1.
Figure 11B:
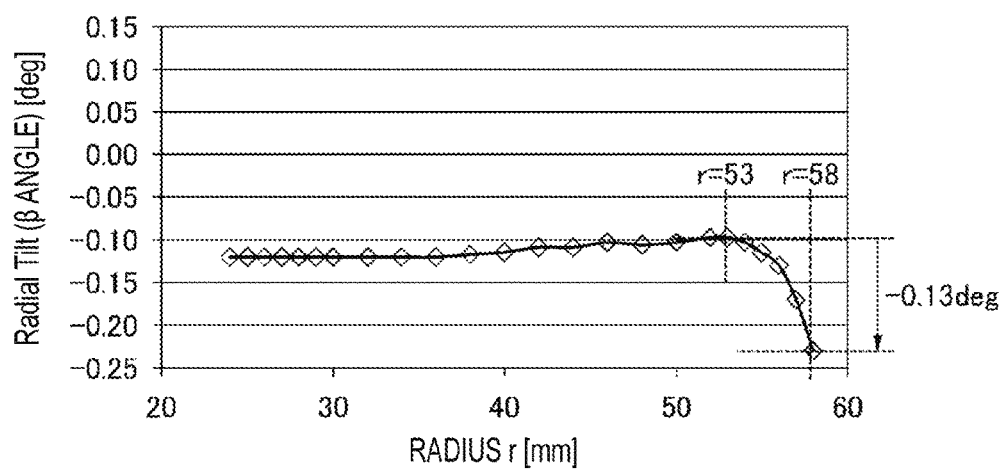
FIG. 11B is a graph illustrating radial dependency of a radial tilt (inner peripheral average value) of a second light irradiation surface in Comparative Example 1.

FIGS. 10A and 10B illustrate the measurement results of the inner peripheral average values of the radial tilts of the first and second light irradiation surfaces of the optical recording medium in Example 2, respectively. FIGS. 11A and 11B illustrate the measurement results of the inner peripheral average values of the radial tilts of the first and second light irradiation surfaces of the optical recording medium in Comparative Example 1, respectively. In the first and second light irradiation surfaces of the optical recording medium in Comparative Example 1, the inner peripheral average value of radial tilts changes sharply outside the radius r=53, and an amount of change between the position of radius r1=53 and the position of radius r2=58 is −0.13 deg. Meanwhile, in the first and second light irradiation surfaces of the optical recording medium in Example 2, a change in the inner peripheral average value of radial tilts outside the radius r=53 is alleviated, and an amount of change between the position of radius r1=53 and the position of radius r2=58 is reduced to −0.04 deg.

(Amount of Change in Radial Tilt)

The amount of change in radial tilt β angle) of the optical recording medium in each of Examples 1 to 5 and Comparative Examples 1 and 2 was determined as follows. First, radial tilts [deg] were measured over a range of one round at each position of radius r1=53 mm and radius r2=58 mm, and an inner peripheral average value of radial tilts [deg] (average value in one round) at each of radii r1 and r2 was calculated. Next, the amount of change in radial tilt [deg] was calculated by the following formula.

Amount of change in radial tilt [deg]=(inner peripheral average value of radial tilts at radius r2)−(inner peripheral average value of radial tilts at radius r1)

(Amount of Inner Peripheral Fluctuation in Radial Tilt)

The amount of inner peripheral fluctuation in radial tilt (β angle) [deg] of each of the PC substrates used for manufacturing the optical recording media in Examples 1 to 5 and Comparative Examples 1 and 2 was determined as follows. First, radial tilts [deg] were measured over a range of one round at a position of radius r2=58 mm. Next, the amount of inner peripheral fluctuation in radial tilt [deg] was calculated by the following formula.

Amount of inner peripheral fluctuation in radial tilt [deg]=(maximum value of radial tilt within periphery)−(minimum value of radial tilt within periphery)

Table 1 illustrates the configurations and evaluation results of the optical recording media in Examples 1 to 5 and Comparative Examples 1 and 2.

TABLE 1

| | Height H of gradient [μm] | Amount of change in Radial-Tilt | | Amount of inner peripheral fluctuation in Radial-Tilt [deg] |
| --- | --- | --- | --- | --- |
| | | First disk [deg] | Second disk [deg] | |
| Example 1 | 10 | −0.07 | −0.08 | 0.11 |
| Example 2 | 20 | −0.04 | −0.04 | 0.13 |
| Example 3 | 30 | −0.03 | −0.02 | 0.15 |
| Example 4 | 50 | −0.02 | −0.03 | 0.18 |
| Example 5 | 70 | −0.02 | −0.02 | 0.22 |
| Comparative Example 1 | 0 | −0.13 | −0.13 | 0.10 |
| Comparative Example 2 | — | −0.04 | −0.04 | — |

Table 1 indicates the following.

When the height of the gradient is 10 μm or more, the amount of change in radial tilt is −0.1 deg or less, and deterioration of radial tilt due to warpage of the first and second disks (opening of the outer peripheral portion) can be suppressed. This is because by setting the height H of the gradient to 10 μm or more, a space having a sufficient size for storing the adhesive was formed on the outer peripheral portion of the stacked PC substrate. Meanwhile, when the height H of the gradient exceeds 50 μm, a stress during molding of the PC substrate increases, and the amount of inner peripheral fluctuation in radial tilt of the PC substrate (single plate state) increases. When the height H of the gradient is 70 μm, the amount of inner peripheral fluctuation in radial tilt reaches 0.22 deg, and bonding may be difficult. Therefore, the height H of the gradient in each of the substrates 11 and 21 is preferably 10 μm or more and 50 μm or less.

The amount of change in radial tilt in Comparative Example 2 in which a stepped depression is formed on the outer peripheral portion of the substrate is similar to the amount of change in radial tilt in Example 2 in which a gradient is formed on the outer peripheral portion of the substrate. However, in Comparative Example 2, a tracking error increased at the position of radius r=53. This is because a local stress is applied to the position of radius r=53 when the PC substrate is molded, and the first and second light irradiation surfaces are distorted in shape. Therefore, a gradient is preferable as a shape to be formed on the outer peripheral portion of the substrate from a viewpoint of suppressing deterioration of signal characteristics.

Hereinabove, the embodiment of the present disclosure has been described specifically. However, the present disclosure is not limited to the above embodiment, but various modifications based on the technical idea of the present disclosure can be made.

For example, the configurations, the methods, the steps, the shapes, the materials, the numerical values, and the like exemplified in the above embodiment are only examples, and a configuration, a method, a step, a shape, a material, a numerical value, and the like different therefrom may be used, if necessary.

Furthermore, the above-described embodiment has described the configuration in which the information signal layer L includes the recording layer 41, the dielectric layer 42 disposed adjacent to an upper surface of the recording layer 41, and the dielectric layer 43 disposed adjacent to a lower surface of the recording layer 41. However, the configuration of the information signal layer L is not limited thereto. For example, a dielectric layer may be disposed only on one of the upper and lower surfaces of the recording layer 41. Furthermore, the information signal layer L may include only the single recording layer 41. With such a simple configuration, cost of the optical recording medium 1 can be reduced, and productivity thereof can be improved. This effect becomes more remarkable as a medium has a larger number of information signal layers L.

Furthermore, the above-described embodiment has described the case where each layer of the optical recording medium is formed by a sputtering method as an example. However, the film formation method is not limited thereto, and other film formation methods may be used. Examples of the other film formation methods include a chemical vapor deposition method (CVD method: technique for depositing a thin film from a gas phase using a chemical reaction) such as thermal CVD, plasma CVD, or photo CVD, and a physical vapor deposition method (PVD method: technique for agglomerating a material that has been physically vaporized in a vacuum on a substrate to form a thin film) such as vacuum vapor deposition, plasma-assisted vapor deposition, sputtering, or ion plating, for example.

Furthermore, the above-described embodiment has described the case where all the plurality of information signal layers have the same layer configuration. However, the layer configuration may be changed according to characteristics (for example, optical characteristics, durability, and the like) required for each of the information signal layers. However, all the information signal layers preferably have the same layer configuration from a viewpoint of productivity.

Furthermore, the above-described embodiment has described the case where the adhesive 31 is irradiated with ultraviolet rays from the first disk side by the ultraviolet lamp 105 to temporarily cure the adhesive 31 while the rotation of the press stage 101 is maintained. However, the adhesive 31 may be irradiated with ultraviolet rays from both sides of the first disk 10 and the second disk 20 by the ultraviolet lamp to temporarily cure the adhesive 31.

Furthermore, the above-described embodiment has described the case where the recording layer is an inorganic recording layer. However, the recording layer may be an organic recording layer.

Furthermore, the present disclosure can adopt the following configurations.

(1)

An optical recording medium including:
a first disk;
a second disk; and
an adhesive layer for bonding the first disk to the second disk, in which
the first disk and the second disk each include:
a substrate having a first surface and a second surface and having a gradient on an outer peripheral portion of the second surface;
two or more information signal layers disposed on the first surface;
an intermediate layer disposed between adjacent ones of the information signal layers; and
a cover layer covering the two or more information signal layers and the intermediate layer, and
the second surface of the substrate included in the first disk faces the second surface of the substrate included in the second disk with the adhesive layer interposed therebetween.

(2)

The optical recording medium according to (1), in which the gradient has a height of 10 μm or more and 50 μm or less.

(3)

The optical recording medium according to (1) or (2), in which
the substrate has a thickness of 0.3 mm or more and 0.6 mm or less, and
the total thickness of the cover layer and the intermediate layer is 30 μm or more and 110 μm or less.

(4) The optical recording medium according to any one of (1) to (3), in which the gradient has a width of 5 mm or more and 10 mm or less.

(5)

The optical recording medium according to any one of (1) to (4), in which the cover layer, the intermediate layer, and the adhesive layer each contain an ultraviolet curable resin.

(6)

The optical recording medium according to (5), in which the ultraviolet curable resin is at least one of an acrylic ultraviolet curable resin and an epoxy-based ultraviolet curable resin.

(7)

A method for manufacturing an optical recording medium, the method including:
sandwiching an adhesive between a first disk and a second disk; and
rotating the first disk and the second disk to stretch the adhesive, in which
the first disk and the second disk each include:
a substrate having a first surface and a second surface and having a gradient on an outer peripheral portion of the second surface;
two or more information signal layers disposed on the first surface;
an intermediate layer disposed between adjacent ones of the information signal layers; and
a cover layer covering the two or more information signal layers and the intermediate layer, and
the second surface of the substrate included in the first disk faces the second surface of the substrate included in the second disk with the adhesive interposed therebetween.

REFERENCE SIGNS LIST

1 Optical recording medium
10 First disk
20 Second disk
30 Adhesive layer
31 Adhesive
11, 21 Substrate
12, 22 Cover layer
41 Recording layer
42, 43 Dielectric layer
L0 to Ln, L0 to Lm Information signal layer
S1 to Sn, S1 to Sm Intermediate layer
C1 First light irradiation surface
C2 Second light irradiation surface

The invention claimed is:

1. An optical recording medium, comprising:
a first disk;
a second disk; and
an adhesive layer that bonds the first disk to the second disk, wherein
each of the first disk and the second disk includes:
a substrate that includes a first surface, a second surface, and a gradient on an outer peripheral portion of the second surface, wherein
the gradient has a width of 5 mm or more and 10 mm or less, the gradient is inclined with respect to the second surface such that a thickness of the substrate decreases in a radial direction, and the radial direction is from a center of the substrate to an outer periphery of the substrate;

a plurality of information signal layers on the first surface;

an intermediate layer between adjacent information signal layers of the plurality of information signal layers; and a cover layer that covers the plurality of information signal layers and the intermediate layer, and the second surface of the substrate of the first disk faces the second surface of the substrate of the second disk with the adhesive layer interposed therebetween.

2. The optical recording medium according to claim 1, wherein the gradient has a height of 10 μm or more and 50 μm or less.

3. The optical recording medium according to claim 1, wherein the substrate has a thickness of 0.3 mm or more and 0.6 mm or less, and a total thickness of the cover layer and the intermediate layer is 30 μm or more and 110 μm or less.

4. The optical recording medium according to claim 1, wherein each of the cover layer, the intermediate layer, and the adhesive layer includes an ultraviolet curable resin.

5. The optical recording medium according to claim 4, wherein the ultraviolet curable resin is at least one of an acrylic ultraviolet curable resin or an epoxy-based ultraviolet curable resin.

* * * * *